US011827175B2

(12) United States Patent
Reed et al.

(10) Patent No.: US 11,827,175 B2
(45) Date of Patent: Nov. 28, 2023

(54) ADAPTING SHOULDER ANCHOR FOR SEATBELT

(71) Applicant: Joyson Safety Systems Acquisition LLC, Auburn Hills, MI (US)

(72) Inventors: Steve Reed, Auburn Hills, MI (US); Len Cech, Auburn Hills, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 17/562,551

(22) Filed: Dec. 27, 2021

(65) Prior Publication Data

US 2022/0203931 A1 Jun. 30, 2022

Related U.S. Application Data

(60) Provisional application No. 63/132,220, filed on Dec. 30, 2020.

(51) Int. Cl.
*B60R 22/48* (2006.01)
*B60R 22/20* (2006.01)
(Continued)

(52) U.S. Cl.
CPC .......... *B60R 22/48* (2013.01); *B60R 21/0134* (2013.01); *B60R 21/01512* (2014.10);
(Continued)

(58) Field of Classification Search
CPC ........ B60R 21/01544; B60R 2022/485; B60R 2022/208; B60R 22/20; B60R 21/01512; B60R 21/0134
(Continued)

(56) References Cited

U.S. PATENT DOCUMENTS 5,165,719 A * 11/1992 Yano ...................... B60R 22/201
280/801.2
5,609,396 A * 3/1997 Loxton ................... B60R 22/26
297/483
(Continued)

FOREIGN PATENT DOCUMENTS

JP 2009227079 A * 10/2009

OTHER PUBLICATIONS

English translation of JP2009227079A Okada Ryo provided from PE2E Search 17562551_Sep. 9, 2022_JP_2009227079_A_M.pdf (Year: 2009).*

*Primary Examiner* — James A English
*Assistant Examiner* — Caitlin Anne Miller
(74) *Attorney, Agent, or Firm* — Meunier Carlin & Curfman LLC

(57) ABSTRACT

Various implementations include a system for adjusting the position of a seatbelt in a vehicle. The system includes a shoulder anchor, at least one sensor, and a processor. The shoulder anchor is for receiving a seatbelt. The shoulder anchor is movable relative to a seat disposed within the vehicle. The processor is in electrical communication with the sensor and a memory. The processor executes computer-readable instructions stored on the memory. The instructions cause the processor to receive sensor data from the sensor, determine whether the seatbelt is within an expected area on a person in the seat based on the received sensor data, and cause the shoulder anchor to move relative to the seat in response to the seatbelt being outside of the expected area on the person in the seat such that the seatbelt is moved into the expected area.

16 Claims, 3 Drawing Sheets

(51) Int. Cl.
    *B60R 21/015*    (2006.01)
    *B60R 21/0134*    (2006.01)
    *G06V 20/59*    (2022.01)
(52) U.S. Cl.
    CPC ........ *B60R 22/20* (2013.01); *B60R 21/01544* (2014.10); *B60R 2022/208* (2013.01); *B60R 2022/485* (2013.01); *G06V 20/59* (2022.01)
(58) Field of Classification Search
    USPC ...................................................... 280/801.2
    See application file for complete search history.

(56) References Cited

U.S. PATENT DOCUMENTS

| | | | | |
|---|---|---|---|---|
| 5,725,248 A * | 3/1998 | Inoue | .................... | B60R 22/203 |
| | | | | 297/483 |
| 6,817,672 B2 * | 11/2004 | Matsunuma | ........... | B60N 2/688 |
| | | | | 297/483 |
| 8,157,045 B2 * | 4/2012 | Hashimoto | .......... | B60N 2/0276 |
| | | | | 180/274 |
| 9,039,094 B2 * | 5/2015 | Yamada | ................. | B60N 2/688 |
| | | | | 297/483 |
| 9,421,944 B2 * | 8/2016 | Cuddihy | ............... | B60R 22/201 |
| 10,252,694 B2 * | 4/2019 | Lin | ....................... | G06V 40/11 |
| 10,501,048 B2 * | 12/2019 | Szawarski | ............. | B60K 28/02 |
| 10,752,203 B2 * | 8/2020 | Jaradi | ..................... | B60R 22/20 |
| 10,889,262 B2 * | 1/2021 | Liau | ....................... | B60R 22/48 |
| 2008/0065291 A1 * | 3/2008 | Breed | ................... | G08B 21/22 |
| | | | | 382/190 |
| 2015/0097410 A1 * | 4/2015 | Carbone | ............... | B60R 22/195 |
| | | | | 297/486 |
| 2017/0361746 A1 * | 12/2017 | Zouzal | ..................... | B60R 1/04 |
| 2018/0361984 A1 * | 12/2018 | Lin | ....................... | G06V 40/11 |
| 2019/0225186 A1 * | 7/2019 | Szawarski | ............ | G06V 20/597 |
| 2020/0331371 A1 * | 10/2020 | Yilma | .................... | B60R 22/18 |
| 2021/0394710 A1 * | 12/2021 | Hu | ....................... | B60W 40/09 |

* cited by examiner

ADAPTING SHOULDER ANCHOR FOR SEATBELT

CROSS-REFERENCE TO RELATED APPLICATIONS

This application claims the benefit of U.S. Provisional Patent Application No. 63/132,220, filed Dec. 30, 2020, the contents of which are incorporated herein by reference in their entirety.

BACKGROUND

Some current seatbelt systems allow for manual adjustment of the position and orientation of the seatbelt webbing by including a mechanism for sliding the shoulder anchor to a higher or lower location. When the shoulder anchor is moved, the webbing that extends through the D-ring of the shoulder anchor is also raised or lowered. Raising or lowering the shoulder anchor also has the effect of changing the angle at which the webbing crosses the seat and the torso of the person in the seat. However, there is no way to change the height of the shoulder anchor and the angle of the webbing independently of each other.

Furthermore, adjusting the height of the shoulder anchor and the angle of the webbing must be performed manually by the user. A first issue with manual adjustment of the height of the shoulder anchor and the angle of the webbing is that a user may not remember to adjust the seatbelt every time the user uses the seatbelt system. Thus, the user may be using a seatbelt position that was correct for a previous user but not for the current user. Also, the user may be using a seatbelt position that was correct for the current user in different conditions but not for the current conditions (e.g., different terrain, different seat reclining angle, person in seat is asleep/awake). A second issue with manual adjustment is that the user may not know the safest position of the shoulder anchor and angle of the webbing under current conditions. Thus, a user may fail to adjust the seatbelt properly to provide the highest level of safety under the current conditions. A third issue with manual adjustment is that, once the position of the shoulder anchor is manually set by the user, the height of the shoulder anchor and the angle of the webbing does not change until the person manually readjusts the system. However, the safest position of the shoulder anchor and angle of the webbing for protecting the person sitting in the seat may change during use based on various conditions.

Therefore, the need exists for a seatbelt system that automatically and actively adjusts the height and angle of the seatbelt independently from each other based on current conditions.

SUMMARY

Various implementations include a system for adjusting the position of a seatbelt in a vehicle. The system includes a shoulder anchor, at least one sensor, and a processor. The shoulder anchor is for receiving a seatbelt. The shoulder anchor is movable relative to a seat disposed within the vehicle. The processor is in electrical communication with the sensor and a memory. The processor executes computer-readable instructions stored on the memory that cause the processor to receive sensor data from the sensor, determine whether the seatbelt is within an expected area on a person in the seat based on the received sensor data, and cause the shoulder anchor to move relative to the seat in response to the seatbelt being outside of the expected area on the person in the seat such that the seatbelt is moved into the expected area.

In some implementations, the shoulder anchor is capable of being disposed within a portion of the seat.

In some implementations, the system further includes a motor for moving the shoulder anchor relative to the seat.

In some implementations, the shoulder anchor is movable from a first position to a second position. The first position is closer than the second position to a seat base of the seat. In some implementations, the shoulder anchor is rotationally movable relative to the seat.

In some implementations, the at least one sensor includes an imaging unit. In some implementations, the imaging unit includes a camera. In some implementations, the imaging unit includes a motion detector.

In some implementations, the sensor data includes an image and the processor determines the expected area of the seatbelt on the person based on a height of the person in the image relative to the seat. In some implementations, the sensor data includes an image and the processor determines the expected area of the seatbelt on the person based on an orientation of the person in the image relative to the seat. In some implementations, the sensor data includes an image and the processor determines the expected area of the seatbelt on the person based on a gesture performed by the person in the image. In some implementations, the sensor data includes information corresponding to an angle of a seat back of the seat relative to a seat base of the seat. In some implementations, the sensor data includes information corresponding to a detection of movement of the person in response to a previous movement of the shoulder anchor. In some implementations, the sensor data includes information corresponding to a detection of movement of the person over a period of time. In some implementations, the sensor data includes information corresponding to a detection of a pre-crash condition of the vehicle.

In some implementations, the system further includes a linear actuator for moving the shoulder anchor relative to the seat. In some implementations, the linear actuator is disposed within the seat.

In some implementations, the system further includes a servo motor for moving the shoulder anchor relative to the seat. In some implementations, the servo motor is a two-axis servo motor for moving the shoulder anchor relative to the seat in two degrees of movement. In some implementations, the servo motor is disposed within the seat.

In some implementations, the system further includes webbing extending through a D-ring opening defined by the shoulder anchor. Movement of the shoulder anchor relative to the seat causes a change in the position and angle of the webbing relative to the seat when the webbing is in a buckled position.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

The devices, systems, and methods described herein include a seatbelt system that automatically and actively adjusts the height of the shoulder anchor and the angle of the webbing extending across the seat and person sitting in the seat when the seatbelt is in the buckled position. The devices, systems, and methods described herein include a drive system that provides three degrees of movement of the shoulder anchor relative to the seat to allow for independent adjustment of the height and angle of the shoulder anchor to move the webbing to different positions and angles relative to the person sitting in the seat.

The devices, systems, and methods described herein also include at least one sensor to monitor one or more conditions of the vehicle, person, and/or seat. A controller uses sensor data from the at least one sensor to determine an expected area of the seatbelt and to cause the drive system to adjust the position of the webbing of the seatbelt to the expected area.

The automatic and active adjustment of the seatbelt system ensures that the height of the shoulder anchor and the angle of the webbing can move to the safest position under current conditions.

Various implementations include a system for adjusting the position of a seatbelt in a vehicle. The system includes a shoulder anchor, at least one sensor, and a processor. The shoulder anchor is for receiving a seatbelt. The shoulder anchor is movable relative to a seat disposed within the vehicle. The processor is in electrical communication with the sensor and a memory. The processor executes computer-readable instructions stored on the memory that cause the processor to receive sensor data from the sensor, determine whether the seatbelt is within an expected area on a person in the seat based on the received sensor data, and cause the shoulder anchor to move relative to the seat in response to the seatbelt being outside of the expected area on the person in the seat such that the seatbelt is moved into the expected area.

Figure 1:
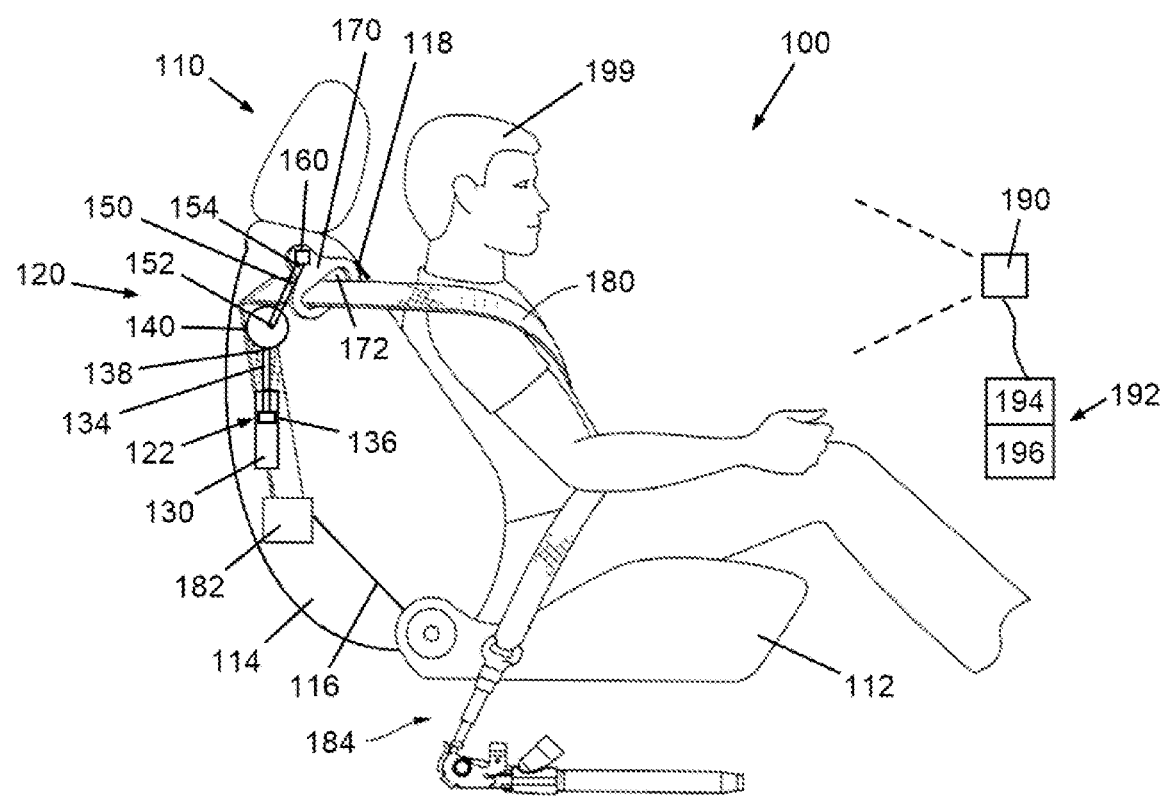
FIG. 1 is a side view of a system for adjusting the position of a seatbelt in a vehicle, according to one implementation.
Figure 2:
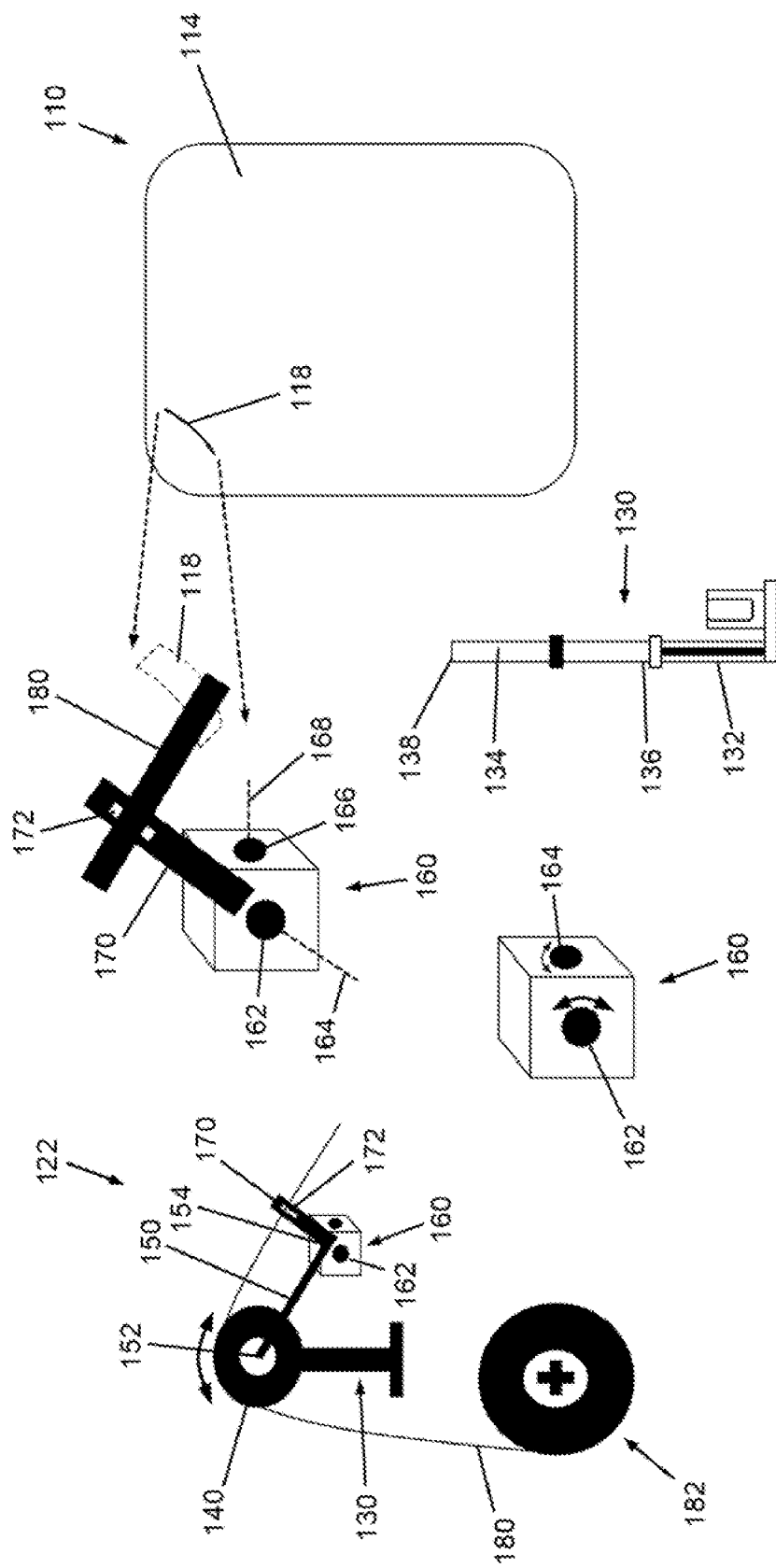
FIG. 2 is a detailed view of the features of the system for adjusting the position of a seatbelt in a vehicle shown in FIG. 1.
Figure 3:
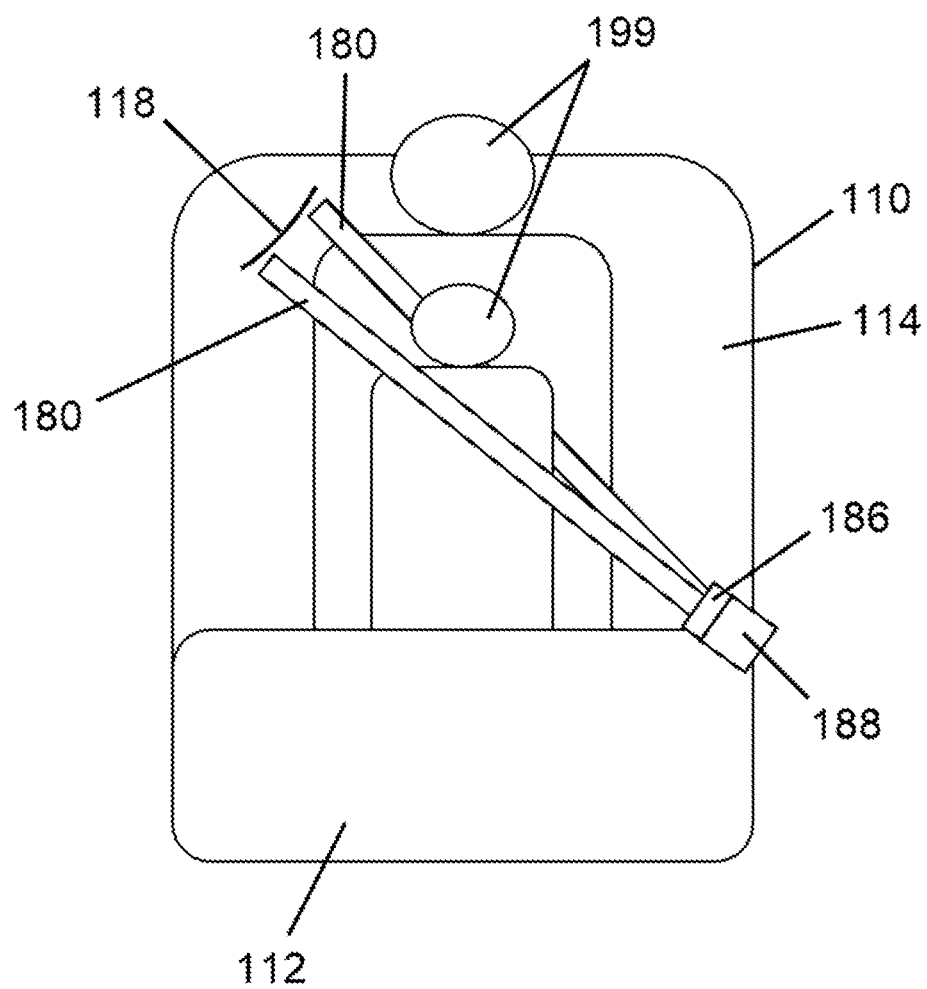
FIG. 3 is a front view of a seat including portions of the system for adjusting the position of a seatbelt in a vehicle shown in FIG. 1.

FIGS. 1-3 show a system 100 for adjusting the position of a webbing 180 of a seatbelt system 120 in a vehicle, according to one implementation. The system 100 includes a seatbelt system 120, a sensor 190, and a controller 192. A portion of the seatbelt system 120 is disposed within a seat 110 of the vehicle. The seat 110 has a seat base 112, a seat back 114 coupled to the seat base 112, and a frame 116 extending throughout the seat base 112 and seat back 114. As shown in FIG. 3, the seat back 114 defines a slit 118 through which the webbing 180 of the seatbelt system 120 extends, as discussed below.

As shown in FIGS. 1-3, the seatbelt system 120 includes a drive system 122, a retractor 182, a shoulder anchor 170, a tongue 186, a lap belt tensioner 184, webbing 180, and a buckle 188.

The drive system 122 shown in FIGS. 1 and 2 includes a linear actuator 130, a spindle 140, a servo arm 150, and a two-axis servo motor 160. The linear actuator 130 is disposed within the seat back 114 and includes a hollow cylindrical housing 132 and a piston rod 134 extending from one axial end of the housing 132. The housing 132 is coupled to the frame 116 of the seat 110. The piston rod 134 has a proximal end 136 disposed within the housing 132 and a distal end 138 opposite and spaced apart from the proximal end 136 such that the distal end 138 of the piston rod 134 is disposed external to the housing 132. The piston rod 134 is selectably slidable within the housing 132 from a retracted position to an extended position or to any desired position in between. The distal end 138 of the piston rod 134 is closer to the seat base 112 in the retracted position than in the extended position.

The spindle 140 is rotatably coupled to the distal end 138 of the piston rod 134 within the seat back 114 such that the spindle 140 is movable with the distal end 138 of the piston rod 134 relative to the housing 132 of the linear actuator 130.

The servo arm 150 is disposed within the seat back 114 and has a first end 152 and a second end 154 opposite and spaced apart from the first end 152. The first end 152 is rigidly coupled to the distal end 138 of the piston rod 134 adjacent the spindle 140 such that the servo arm 150 is movable with the distal end 138 of the piston rod 134 and the spindle 140 relative to the housing 132 of the linear actuator 130.

The two-axis servo motor 160 is disposed within the seat back 114 and has a first output shaft 162 having a first output shaft axis 164 and a second output shaft 166 having a second output shaft axis 168. The first output shaft axis 164 and the second output shaft axis 168 are transverse to each other. The first output shaft 162 and the second output shaft 166 are selectably rotatable to any angular position.

The first output shaft 162 is coupled to the second end 154 of the servo arm 150 such that rotation of the first output shaft 162 by the servo motor 160 causes the servo motor 160 to rotate about the first output shaft axis 164.

The shoulder anchor 170 is disposed within the seat back 114 and defines a D-ring opening 172. The shoulder anchor 170 is coupled to the second output shaft 166 such that rotation of the second output shaft 166 by the servo motor 160 causes the shoulder anchor 170 to rotate about the second output shaft axis 168.

Thus, by rotating both the first output shaft 162 and the second output shaft 166, the servo motor 160 can rotate the shoulder anchor 170 in two degrees of motion relative to the seat 110. The linear movement transferred from linear actuator 130, through the servo arm 150 and servo motor 160, to the shoulder anchor 170 provides a third degree of motion relative to the seat 110.

The retractor 182, the lap belt tensioner 184, and the buckle 188 are each rigidly coupled to the frame 116 of the seat 110. The webbing 180 extends from the retractor 182, along the spindle 140, through the D-ring opening 172 of the shoulder anchor 170, through the slit 118 defined by the seat back 116, to the lap belt tensioner 184. The tongue 186 is slidingly disposed along the webbing 180 and is couplable to the buckle 188. By moving the shoulder anchor 170 in one or more of the three degrees of motion, the position and/or the angle of the webbing 180 of the seatbelt system 120 can be adjusted relative to a person 199 sitting in the seat 110.

Although the drive system 122 shown in FIGS. 1 and 2 includes a linear actuator 130 and a two-axis servo motor 160, in other implementations, the drive system includes linear actuators, servo motors with any number of axes, motors, pulley and cable systems, cam systems, guide rail and bearing systems, guide pin and guide systems, or any combination of one or more of these or any other devices or systems capable of automatically changing the position and/or the angle of the shoulder anchor in any degree of movement. The seatbelt system 120 shown in FIGS. 1-3 includes a lap belt tensioner 184, but in other implementations, the seatbelt system does not include a lap belt tensioner, and the webbing is directly anchored to the frame of the seat or to the vehicle. Although certain features of the system shown in FIGS. 1-3 are shown either disposed within or outside certain portions of the seat 110, in other implementations, features may be disposed anywhere within the vehicle. In some implementations, features that are coupled to the seat frame are coupled to the frame of the vehicle.

The sensor 190 is a camera disposed within the cabin of the vehicle and oriented such that the camera 190 is facing the seat 110. The camera 190 generates sensor data in the form of an image of the seat 110 and a person 199 that is sitting in the seat 110. Although the sensor 190 shown in FIG. 1 is a camera, in other implementations, the sensor is any imaging unit, such as a motion detector, or any other type of sensor capable of determining the position of the webbing of the seatbelt relative to a person in the seat. In some implementations, the system can include more than one sensor. In some implementations, the sensor can be facing externally of the vehicle to monitor external conditions relative to the vehicle, such as for detection of a pre-crash condition of the vehicle.

As shown in FIG. 1, the controller 192 includes a processor 194 and a memory 196. The processor 194 is in electrical communication with the sensor 190 and the memory 196. The memory 196 includes computer-readable instructions, and the processor 194 is configured to execute the computer-readable instructions based on the sensor data and to move the shoulder anchor 170. The memory 196 stores locations of expected areas for the webbing 180 of the seatbelt system 120 relative to a person 199 in the seat 110 based on the sensor data. The computer-readable instructions cause movement of the linear actuator 130 and servo motor 160 to adjust the location of the webbing 180 if the webbing 180 is outside of an expected area. The expected area can be the safest position, the most comfortable position, or any other desirable position of the webbing 180 of the seatbelt system 120 relative to the person 199 sitting in the seat 110. In some implementations, the memory 196 stores locations of expected areas for the webbing of the seatbelt relative to a person in the seat based on the sensor data and the computer-readable instructions include one or more algorithms for determining the expected area for the webbing based on the sensor data.

Once the processor 194 receives sensor data in the form of image data from the sensor 190, the processor 194 determines whether the webbing 180 of the seatbelt system 120 is within an expected area on a person 199 in the seat 110 based on the sensor data. If the webbing 180 is outside the expected area, the processor 194 sends signals to the linear actuator 130 and/or servo motor 160 to cause the shoulder anchor 170 to move relative to the seat 110 such that the webbing 180 moves into the expected area.

The processor 194 can determine the expected area of the webbing 180 relative to the person 199 based on different conditions in the sensor data, other data, or both. Based on conditions in the sensor data, the expected area of the webbing 180 can be a raised position, a lowered position, a rotated position, a tightened position, a loosened position, or any other position determined to be a safe position based on the conditions in the sensor data.

In one example, the sensor data includes image data from the camera. The processor 194 can determine the expected area of the webbing 180 on the person 199 based on a height of the person 199 in the image relative to the seat 110.

In another example, the sensor data includes image data from the camera. The processor 194 can determine the expected area of the webbing 180 on the person 199 based on an orientation of the person 199 in the image or other sensor data relative to the seat 110 (e.g., if the seat is reclined or if the person is bending over). In other examples, the sensor data includes information corresponding to an angle of the seat back 114 relative to the seat base 112, and the processor 194 can determine the expected area of the webbing 118 on the person 199 based on the angle of the seat back 114 relative to the seat base 112.

In another example, the sensor data includes image data from the camera. The processor 194 can determine the expected area of the webbing 180 on the person 199 based on a gesture performed by the person 199 in the image or other sensor data (e.g., a hand signal).

In some examples, the processor 194 causes a movement of the shoulder anchor 170 relative to the seat 110 such that the webbing 180 moves on the person 199. The sensor data includes information corresponding to a detection of movement of the person 199 in response to the previous movement of the shoulder anchor 170. The processor 194 determines the expected area of the webbing 180 on the person 199 based on whether the person 199 moves in response to the previous movement of the shoulder anchor 170.

In some examples, the sensor data includes information corresponding to a detection of movement of the person 199 over a period of time. The processor 194 determines the expected area of the webbing 180 on the person 199 based on the amount of movement of the person 199 during the period of time.

In some examples, the sensor data includes information corresponding to a detection of a pre-crash condition of the vehicle. The processor 194 determines the expected area of the webbing 180 on the person 199 based on whether a pre-crash condition exists.

In any of the above examples, if the webbing 180 of the seatbelt system 120 is not within the expected area (e.g., properly positioned and angled over the shoulder of the person 199), the processor 194 causes the linear actuator 130 and/or the servo motor 160 to move the shoulder anchor 170 such that the webbing 180 is moved into the expected area, as shown in FIG. 3.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," and "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A system for adjusting the position of a seatbelt in a vehicle, the system comprising:
    a shoulder anchor for receiving a seatbelt, the shoulder anchor being movable relative to a seat disposed within the vehicle, wherein the shoulder anchor is capable of being disposed within a portion of the seat;
    at least one sensor;
    a servo motor for moving the shoulder anchor relative to the seat, wherein the servo motor is a two-axis servo motor for moving the shoulder anchor relative to the seat in two degrees of movement; and
    a processor in electrical communication with the sensor and a memory, wherein the processor executes computer-readable instructions stored on the memory, the instructions causing the processor to:
        receive sensor data from the sensor,
        determine whether the seatbelt is within an expected area on a person in the seat based on the received sensor data, and
        cause the shoulder anchor to move relative to the seat in response to the seatbelt being outside of the expected area on the person in the seat such that the seatbelt is moved into the expected area.

2. The system of claim 1, wherein the shoulder anchor is movable from a first position to a second position, wherein the first position is closer than the second position to a seat base of the seat.

3. The system of claim 1, wherein the shoulder anchor is rotationally movable relative to the seat.

4. The system of claim 1, wherein the at least one sensor comprises an imaging unit.

5. The system of claim 4, wherein the imaging unit comprises a camera.

6. The system of claim 1, wherein the sensor data comprises an image and the processor determines the expected area of the seatbelt on the person based on a height of the person in the image relative to the seat.

7. The system of claim 1, wherein the sensor data comprises an image and the processor determines the expected area of the seatbelt on the person based on an orientation of the person in the image relative to the seat.

8. The system of claim 1, wherein the sensor data comprises an image and the processor determines the expected area of the seatbelt on the person based on a gesture performed by the person in the image.

9. The system of claim 1, wherein the sensor data includes information corresponding to an angle of a seat back of the seat relative to a seat base of the seat.

10. The system of claim 1, wherein the sensor data includes information corresponding to a detection of movement of the person in response to a previous movement of the shoulder anchor.

11. The system of claim 1, wherein the sensor data includes information corresponding to a detection of movement of the person over a period of time.

12. The system of claim 1, wherein the sensor data includes information corresponding to a detection of a pre-crash condition of the vehicle.

13. The system of claim 1, further including a linear actuator for moving the shoulder anchor relative to the seat.

14. The system of claim 13, wherein the linear actuator is disposed within the seat.

15. The system of claim 1, wherein the servo motor is disposed within the seat.

16. The system of claim 1, further including webbing extending through a D-ring opening defined by the shoulder anchor, wherein movement of the shoulder anchor relative to the seat causes a change in the position and angle of the webbing relative to the seat when the webbing is in a buckled position.

* * * * *